United States Patent
Ban et al.

(10) Patent No.: US 8,380,342 B2
(45) Date of Patent: Feb. 19, 2013

(54) WORKPIECE REMOVING DEVICE AND METHOD

(75) Inventors: Kazunori Ban, Minamitsuru-gun (JP); Hidetoshi Kumiya, Minamitsuru-gun (JP); Toshiyuki Ando, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 31 days.

(21) Appl. No.: 13/184,721

(22) Filed: Jul. 18, 2011

(65) Prior Publication Data

US 2012/0029686 A1 Feb. 2, 2012

(30) Foreign Application Priority Data

Jul. 27, 2010 (JP) ................................. 2010-167987

(51) Int. Cl.
*G06F 7/00* (2006.01)
(52) U.S. Cl. ....................................................... 700/218
(58) Field of Classification Search .................. 700/218, 700/214, 213, 121
See application file for complete search history.

(56) References Cited

U.S. PATENT DOCUMENTS

| 4,876,728 A | * | 10/1989 | Roth | 382/153 |
| 5,987,591 A | * | 11/1999 | Jyumonji | 700/259 |
| 6,845,296 B2 | * | 1/2005 | Ban et al. | 700/245 |
| 7,844,104 B2 | * | 11/2010 | Tropf | 382/153 |
| 2007/0274812 A1 | | 11/2007 | Ban et al. | |

FOREIGN PATENT DOCUMENTS

| EP | 1 862 270 A2 | 12/2007 |
| JP | 01-134573 | 5/1989 |
| JP | 07-187398 | 7/1995 |
| JP | 2007-313624 | 12/2007 |
| JP | 2008-087074 | 4/2008 |
| JP | 4199264 | 10/2008 |
| JP | 2010-120141 | 6/2010 |

* cited by examiner

*Primary Examiner* — Ramya Burgess
(74) *Attorney, Agent, or Firm* — Drinker Biddle & Reath LLP (57) ABSTRACT

A workpiece removing device including a camera for imaging a workpiece loading area including a plurality of workpieces loaded in bulk; a workpiece detection section for detecting a workpiece, based on a camera image taken with the camera; a workpiece selection section for selecting a workpiece adapted to be removed, based on a detection result by the workpiece detection section; a robot for removing the workpiece selected by the workpiece selection section; a loading state determination section for determining whether a loading state of the workpieces in the workpiece loading area has changed due to a operation of the robot; and an area setting section for setting a workpiece detection area where the workpiece detection section detects a workpiece. If the loading state determination section determines that the loading state of the workpieces has changed, the area setting section sets the workpiece detection area in a peripheral area of a changing position of the loading state, i.e., in a portion of the workpiece loading area.

8 Claims, 5 Drawing Sheets

Fig.4

WORKPIECE REMOVING DEVICE AND METHOD

BACKGROUND OF THE INVENTION

1. Field of the Invention

The present invention relates to a device and method for removing a workpiece by using a robot from among workpieces loaded in bulk in a container.

2. Description of the Related Art

There is a known device in which an image of an entire area of a plurality of workpieces arranged randomly (loaded in bulk) in a container is captured with a camera, and based on the captured image, workpieces are detected and removed a workpiece automatically by using a robot manipulator. In the device described in Japanese Patent Publication No. 4199264 (JP4199264B), it is determined whether or not the loading state of workpieces in a container has changed. Then, if it is determined that the loading state has not changed, without imaging the loaded workpieces in the next workpiece removing operation, a workpiece is detected based on the image captured previously. As a result, the step of imaging with the camera is omitted, and therefore, time spent on the workpiece removing operation can be reduced.

However, generally the loading state of workpieces usually changes in the next workpiece removing operation. Therefore, in the device described in JP4199264B, when it is determined that the loading state of workpieces has changed, it is necessary that an image of entire area of a plurality of workpieces be captured again with a camera, and a workpiece be detected based on the captured image. As a result, in the device described in JP4199264 B, there are few cases where the step of imaging with the camera is omitted, and it is difficult to improve the efficiency of the workpiece removing operation.

SUMMARY OF THE INVENTION

One aspect of the present invention provides a workpiece removing device comprising a camera for imaging a workpiece loading area including a plurality of workpieces loaded in bulk, a workpiece detection section for detecting a workpiece based on a camera image imaged with the camera, a workpiece selection section for selecting a workpiece adapted to be removed based on a detection result by the workpiece detection section, a robot for removing the workpiece selected by the workpiece selection section, a loading state determination section for determining whether a loading state of the workpiece in the workpiece loading area has changed due to a operation of the robot, and an area setting section for setting a workpiece detection area where the workpiece detection section detects a workpiece, wherein, if the loading state determination section determines that the loading state of the workpieces has changed, the area setting section sets the workpiece detection area in a portion of the workpiece loading area, the portion being a peripheral area of a changing position of the loading state.

Another aspect of the present invention provides a workpiece removing method comprising an imaging step for imaging a workpiece loading area including a plurality of workpieces loaded in bulk with a camera, a workpiece detection step for detecting a workpiece based on a camera image imaged with the camera, a workpiece selection step for selecting a workpiece adapted to be removed based on a detection result in the workpiece detection step, a workpiece removing step for removing the workpiece selected in the workpiece selection step with a robot, a loading state determination step for determining whether a loading state of the workpieces in the workpiece loading area has changed due to a operation of the robot, and an area setting step for setting a workpiece detection area for detecting the workpiece in the workpiece detection step, wherein in the area setting step, if it is determined in the loading state determination step that the loading state of the workpieces has changed, the workpiece detection area is set in a portion of the workpiece loading area, the portion being a peripheral area of a changing position of the loading state.

BRIEF DESCRIPTION OF THE DRAWINGS

The objects, features and advantages of the present invention will become more apparent from the following description of embodiments taken in conjunction with the accompanying drawings, in which.

DETAILED DESCRIPTION

Figure 1:
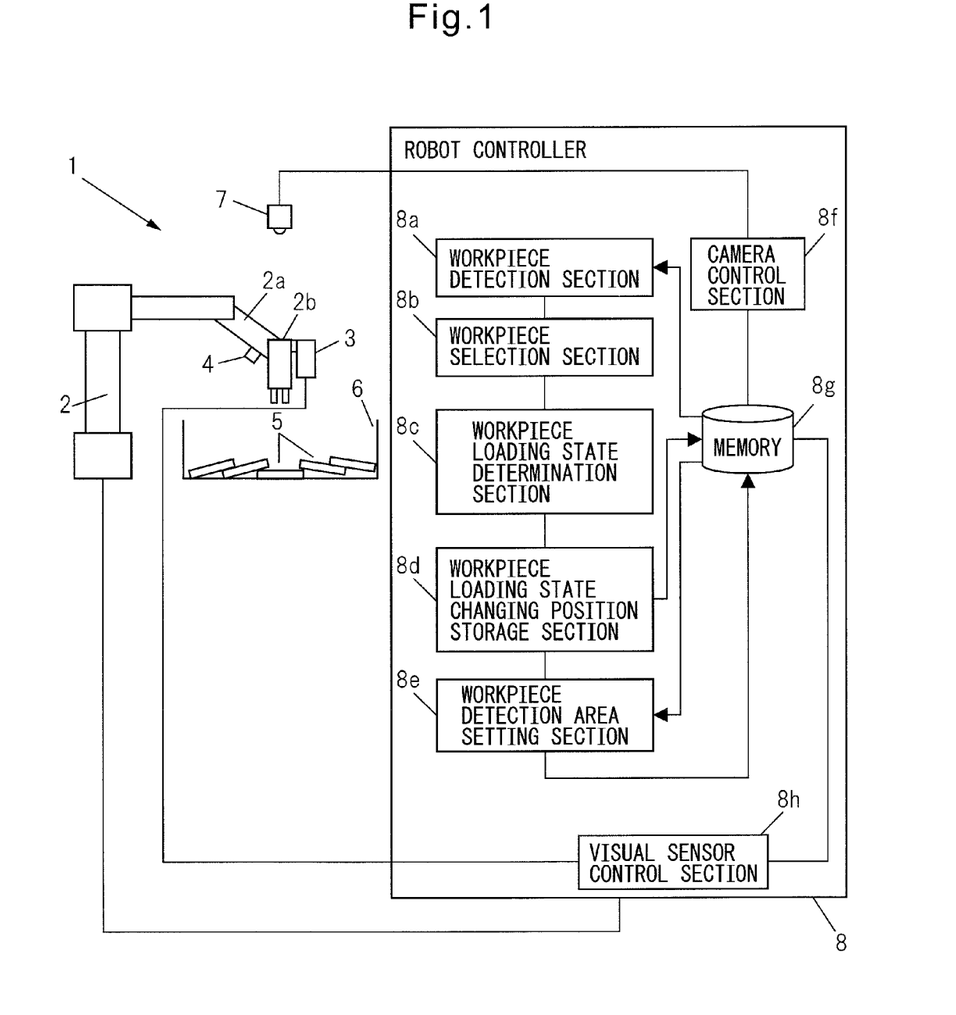
FIG. 1 is a view showing the general construction of a workpiece removing device according to an embodiment of the present invention.

Hereinafter, an embodiment of the present invention will be described below with reference to FIGS. 1 to 5b. FIG. 1 is a view showing the general construction of a workpiece removing device 1 according to an embodiment of the present invention. A plurality of workpieces 5 which are the same kind are randomly disposed (loaded in bulk) in a container 6. The workpiece removing device 1 comprises a robot 2 for removing a selected workpiece 5 from among the plurality of workpieces 5 loaded in bulk, a camera 7 fixedly disposed above the container 6, and a robot controller 8 for controlling the robot 2 based on a camera image captured by the camera 7.

The robot 2 is a multi-joint robot having rotatable joint axes. A workpiece 5 is grasped by a robot hand 2b provided at the distal end of a robot arm 2a. A visual sensor 3 is provided on the robot hand 2b, and individual workpiece 5 is measured with the visual sensor 3. The visual sensor 3 is a 3-dimensional visual sensor of laser light projection type, and is controlled by a visual sensor control section 8h in a robot controller 8. Measurement data obtained by the visual sensor 3 are stored in a memory 8g in the robot controller 8 to determine 3-dimensional position and attitude of workpieces 5 in detail in a processing in the robot controller 8. A shock sensor 4 is provided on the robot arm 2a, and a shock exerted on the robot arm 2a at the time of removing of the workpiece is detected by the shock sensor 4.

The camera 7 is an electronic camera having an imaging element such as CCD, and is a well known light receiving device which has the function of detecting 2-dimensional image on a light receiving surface (on a CCD array plane) by imaging. The imaging operation of the camera 7 is controlled by a camera control section 8f in the robot controller 8. The range of an imaging area is set so as to embrace the workpiece loading area (for example, entire container) including a plurality of workpieces 5 in the field of view. The camera image is captured by the camera control section 8f and is stored in the memory 8g.

The robot controller 8 comprises a workpiece detection section 8a for detecting workpieces 5 based on the image stored in the memory 8g, a workpiece selection section 8b for selecting a workpiece 5 to be removed from among the workpieces 5 detected by the workpiece detection section 8a, a workpiece loading state determination section 8c for determining whether or not the loading state of the workpieces 5 in the container 6 has changed, a workpiece loading state changing position storage section 8d for storing the loading state changing positions of the workpieces 5, and a workpiece detection area setting section 8e for setting a workpiece detection area where the workpiece detection section 8a detects workpieces 5, and these sections, together with the camera control section 8f and the memory 8g, constitute an image processing unit for processing the camera image.

The workpiece detection section 8a detects workpieces 5, for example, by pattern matching. That is, a work piece model corresponding to the figure of the workpiece 5 is prepared in advance, and a target image corresponding to this workpiece model is retrieved and extracted from the camera image in the workpiece detection area to detect workpieces 5. In such a processing in the workpiece detection section 8a, if the workpiece detection area is large, it takes time to retrieve the target image. Furthermore, the robot has to wait for completion of the retrieval of the target image before starting the workpiece removing operation, and therefore it is difficult to carry out the workpiece removing operation efficiently. Therefore, in this embodiment, it is intended to reduce the time spent on the workpiece removing operation by setting the workpiece detection area as described below.

Figure 2:
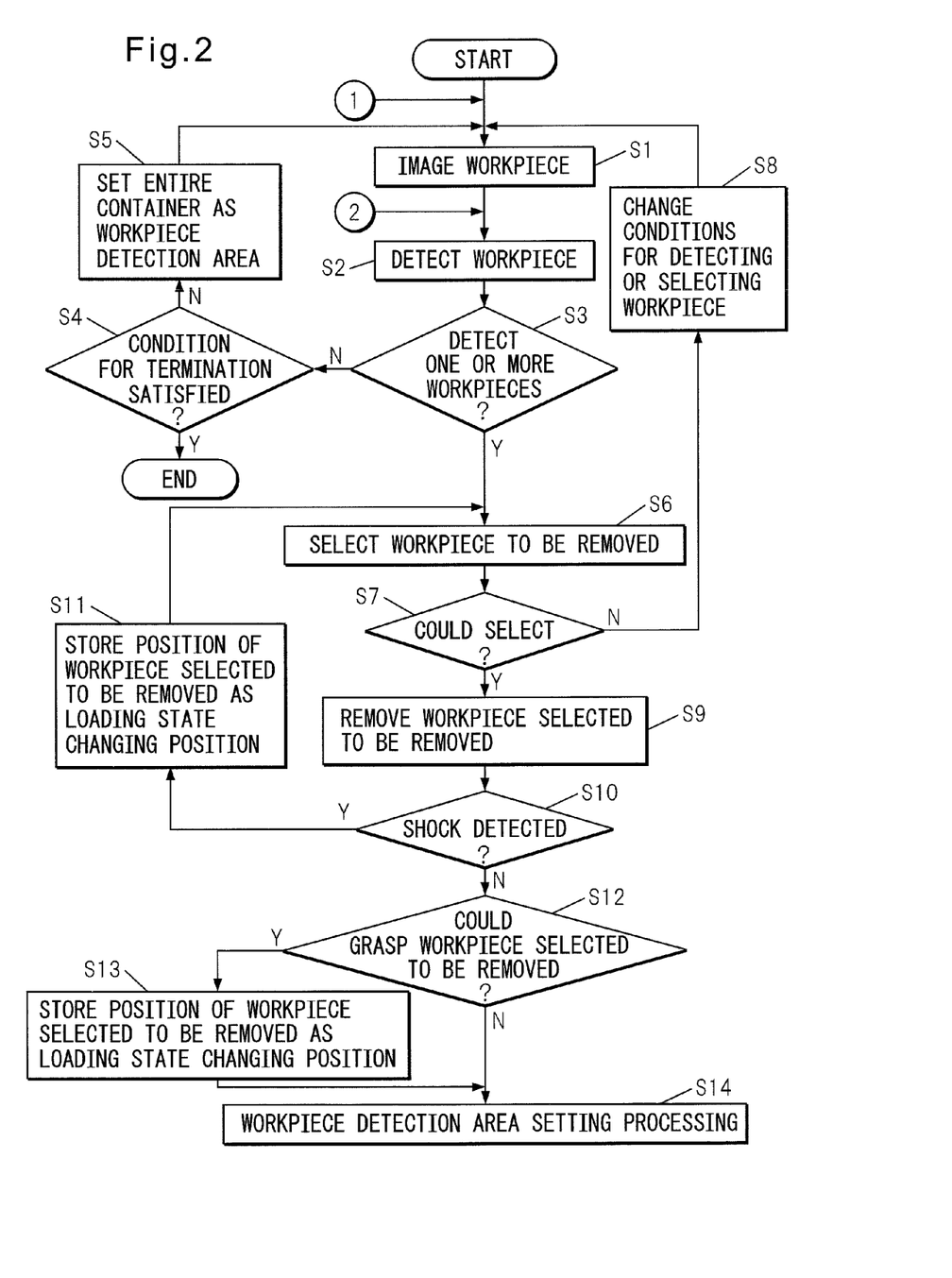
FIG. 2 is a flow chart showing an example of processing executed in CPU in a robot controller of FIG. 1.

FIG. 2 is a flow chart showing an example of a processing carried out in CPU of the robot controller 8. The processing shown in the flow chart starts, for example, when a command for starting the workpiece removing operation is inputted. At step S1, in a processing in the camera control section 8f, an imaging command is outputted to the camera 7 so as to take an image of workpieces 5 in the workpiece loading area in the container, and the camera image obtained by the imaging is stored in the memory 8g.

At step S2, workpieces 5 are detected from the camera image stored in the memory 8g, using camera image in the workpiece detection area, by processing in the workpiece detection section 8a (pattern matching), and the detected workpieces 5 are stored in the memory 8g. In an initial state immediately after the processing of FIG. 2 is started, the workpiece detection area is set corresponding to the workpiece loading area so as to surround the entire container. As described later, in case where a plurality of workpiece detection areas are set in a portion of the workpiece loading area (FIG. 5b), workpieces 5 are detected in each workpiece detection area.

At step S3, it is determined whether or not, one or more workpieces 5 have been detected in the processing at step S2. If a negative decision is made at step S3, the processing proceeds to step S4, and it is determined whether or not a specified termination condition is satisfied. If, for example, a predetermined number of workpieces 5 are removed, it is determined that a specified termination condition is satisfied. If an affirmative decision is made at step S4, the processing is terminated. If a negative decision is made at step S4, the processing proceeds to step S5, and a workpiece detection area is set so as to surround the entire container, then the processing returns to step S1. On the other hand, if an affirmative decision is made at step S3, the processing proceeds to step S6.

At step S6, from all workpieces 5 in the container stored in the memory 8g at step S2, a workpiece 5 to be removed by the robot 2 is selected in the processing in the workpiece selection section 8b. In this case, for example, a workpiece 5 that is located at higher position than nearby workpieces 5 and not covered by other workpieces, is selected as the workpiece to be removed.

At step S7, it is determined whether or not a workpiece 5 has been selected in the processing at step S6. If a negative decision is made at step S7, the processing proceeds to step S8, and detection conditions or selection conditions are modified so as to enable the selection of a workpiece 5. For example, light intensity at the time of imaging or the workpiece pattern in the pattern matching or the like is modified, and then, the processing returns to step S1. If an affirmative decision is made at step S7, the processing proceeds to step S9.

At step S9, a control signal is outputted to a servo motor for driving the robot so as to control the operation of the robot 2 (robot arm 2a and robot hand), so that the selected workpiece 5 is removed from the container. In this case, a displaced position of the visual sensor 3 provided at the distal end of the robot arm is computed, and the 3-dimensional position and attitude of the selected workpiece 5 is measured with the visual sensor 3. Then, after the robot hand is moved to the target position for removing the workpiece, the workpiece 5 is grasped by the robot hand and is removed.

At step S10, by processing in the workpiece loading state determination section 8c, it is determined whether or not a shock has been detected by the shock sensor 4 during the operation of the robot 2, i.e., whether or not a shock is resulted from contact of the robot 2 with workpieces 5 or the like before the selected workpiece 5 is grasped. In place of the shock sensor 4, presence or absence of a shock may be determined by detecting change of the motor current due to sudden variation of the load imposed on the servo motor for driving the robot.

If an affirmative decision is made at step S10, the processing proceeds to step S11. In this case, it is highly probable that the loading state of workpieces 5 in the container, particularly the loading state near the workpiece 5 to be removed, has changed due to occurrence of the shock. Therefore, at step S11, by processing in the workpiece loading state changing position storage section 8d, the position of the workpiece 5 selected to be removed is stored as a loading state changing position, and then, the processing returns to step S6 to repeat a selection processing for the workpiece 5. In this repeated workpiece selection processing, a workpiece 5 to be removed may be selected from workpieces 5 at position separated from the loading state changing position, that is, from workpieces 5 for which it is estimated that the loading state has not changed. The loading state changing position is 3-dimensional position of workpieces 5 detected by the visual sensor 3, and is stored as position data in the robot coordinate system.

At step S10, if a shock has been detected when the robot hand is being moved to the position of the workpiece 5 to be removed, it is highly probable that the loading state has changed not near the workpiece 5 to be removed, but at position where the robot 2 was shocked. In this case, at step S11, the position of the distal end of the robot arm when the robot 2 was shocked, may be stored as the loading state changing position in the memory 8g. The position of the distal end of the robot arm can be detected with various position sensor provided on the robot 2.

If a negative decision is made at step S10, the processing proceeds to step S12. At step S12, by processing in the workpiece loading state determination section 8c, it is determined whether or not the robot hand could grasp the workpiece 5 to be removed. More specifically, success or failure of the grasping operation is determined, based on a detected value of an open and close check sensor of a hand chuck or, based on a detected value of a suction check sensor if the robot hand is of a type utilizing a sucker. It is also possible to determine success or failure of the grasping operation, based on a detected value of a proximity sensor or the like that detects whether or not the workpiece 5 is at correct position relative to the robot hand.

If an affirmative decision is made at step S12, the processing proceeds to step S13. In this case, it is highly probable that the loading state of workpieces 5 in the container, particularly the loading state near the position for removing workpiece 5, has changed as a result of grasping and removing of the workpiece 5. Therefore, at step S13, by processing in the workpiece loading state changing position storage section 8d, as well as the processing in step S11, the position of the workpiece 5 selected to be removed is stored as the loading state changing position, and the processing proceeds to step S14. Considering that, when actual position of the workpiece 5 deviates from the position of selected workpiece 5, the robot hand may be moved, for example, below the position of selected workpiece 5 to grasp the workpiece 5, the actual position at which the workpiece 5 has been grasped may be stored as the loading state changing position in the memory 8g. If a negative decision is made at step S12, the processing proceeds to step S14.

Figure 3:
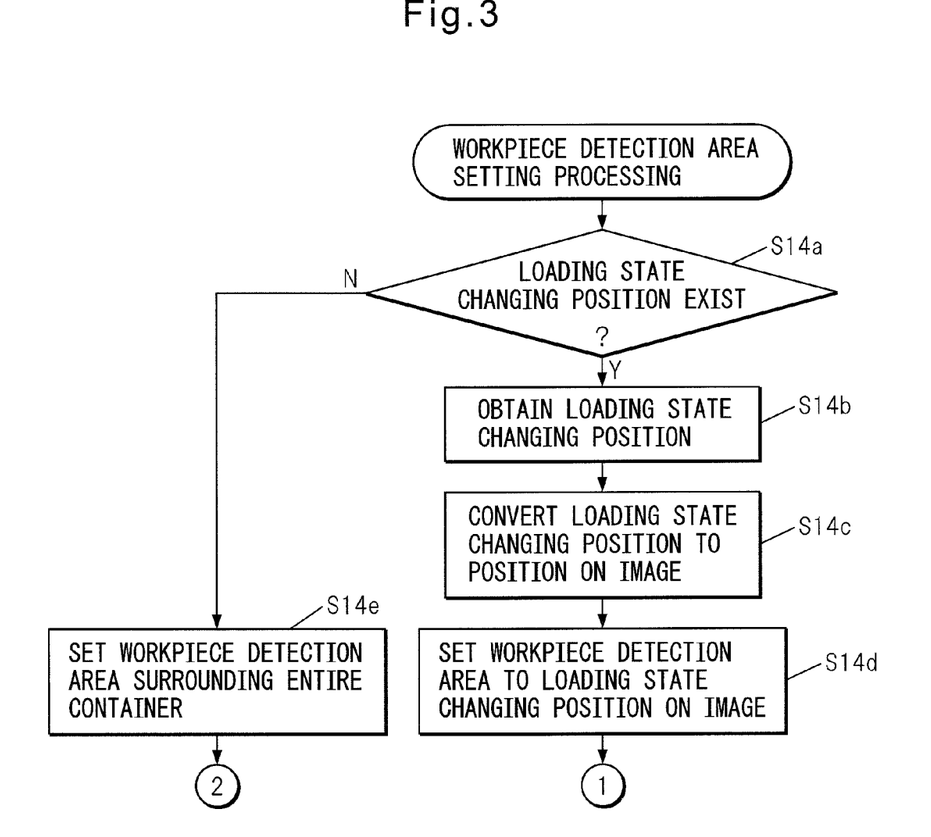
FIG. 3 is a flow chart showing details of a workpiece detection area setting process in FIG. 2.

At step S14, by processing in the workpiece detection area setting section 8e, a workpiece detection area setting processing shown in FIG. 3 is carried out. Firstly, at step S14a, it is determined whether or not a loading state changing position exists, i.e., either processing at step S11 or at step S13 has been carried out. If an affirmative decision is made at step S14a, the processing proceeds to step S14b, and the loading state changing position in the robot coordinate system that is stored in the workpiece loading state changing position storage section 8d is obtained. At step S14c, the loading state changing position in the robot coordinate system is transformed into a position on the image. More specifically, using calibration data of the camera 7, the loading state changing position in the robot coordinate system is transformed into a position on the camera image by the well known technique.

At step S14d, a workpiece detection area of predetermined shape and size is set at the loading state changing position on the image. For example, if the workpiece detection area is circular, a diameter or radius of a circle with the center at the loading state changing position may be set, and if the workpiece detection area is rectangular, a longitudinal length and a transverse length of a rectangular window with the center at the loading state changing position may be set. In any case, the workpiece detection area is set at least in a portion of the workpiece loading area imaged by the camera 7, i.e., in a range narrower than the workpiece loading area. If the loading state changing position is located at a plurality of positions, the workpiece detection areas are set at respective positions.

When the processing at step S14d is completed, the processing returns to step S1 of FIG. 2. After that, a series of processing are repeated. In the repeated processing, at step S2, workpieces 5 are detected from the workpiece detection area set in a portion of the workpiece loading area, and the workpiece detection data in the workpiece detection area is replaced with the new workpiece detection data, and is stored in the memory 8g. That is, a peripheral area of the position at which the loading state of workpieces 5 has changed is set as the workpiece detection area for carrying out the detection processing of workpieces 5, and the workpiece detection data in the area is renewed. Thus, since workpieces 5 need not be detected over the entire workpiece loading area, time required for processing in the workpiece detection section 8a can be shortened.

On the other hand, if, at step S14a, it is determined that the loading state changing position does not exist, the processing proceeds to step S14e. At step S14e, a workpiece detection area is set to the whole workpiece loading area so as to surround the entire container, and the processing returns to step S2 of FIG. 2. In this case, since there is no change in the workpiece loading state, it is not necessary to image with the camera 7 again, and at step S2 in the repeated processing, workpieces 5 are detected from the entire container.

With regard to the processing at step S14d for setting the workpiece detection area, the size of workpiece 5 on the image taken with the camera 7 varies in accordance with distance from the camera 7 to workpiece 5, that is, in accordance with height of workpiece 5 disposed in the container. Taking this into account, the size of workpiece detection area may be changed automatically in accordance with height of workpiece 5. That is, if a workpiece 5 is near the camera 7, the size of workpiece detection area can be set large, and if a workpiece 5 is far from the camera 7, the size of workpiece detection area can be set small, so that the size on the image of a workpiece 5 included in workpiece detection area becomes constant. This will be explained in detail below.

Figure 4:
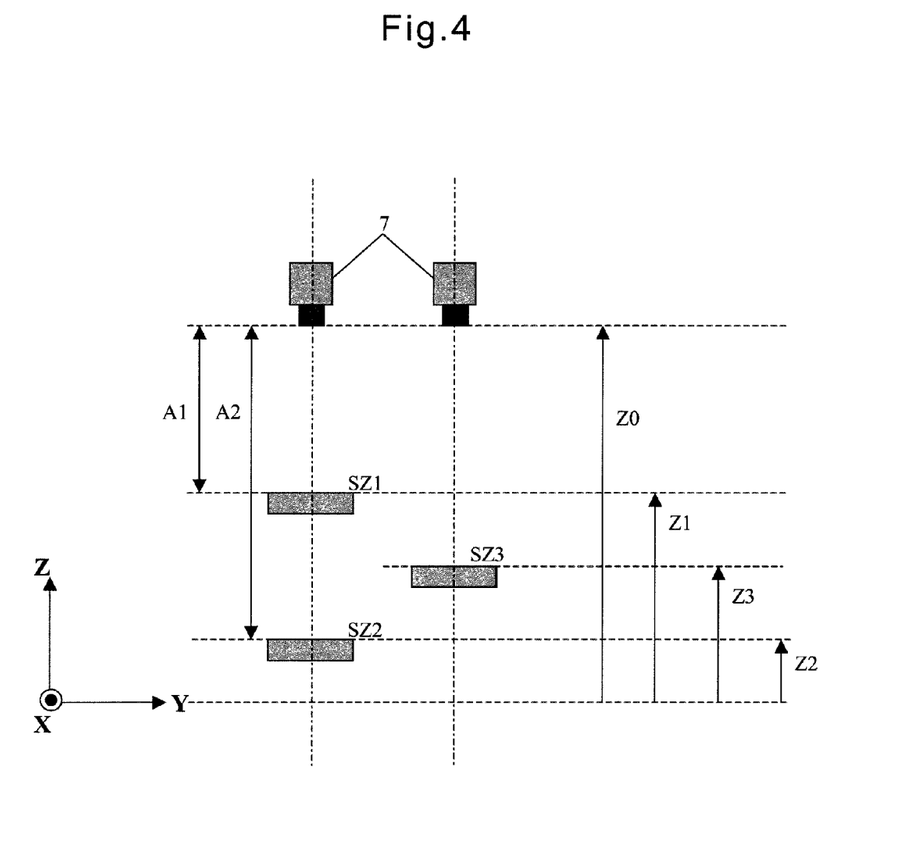
FIG. 4 is a view useful for explaining a method for automatically changing the size of the workpiece detection area.

FIG. 4 is a view useful for explaining a method for automatically changing the size of the workpiece detection area. Hereinafter, height direction of workpiece 5 is defined as Z-axis in the drawing. Firstly, image sizes SZ1 and SZ2 are set as the size on the image taken with the camera 7 when a workpiece 5 is at height Z1 and Z2 from a reference position, respectively. The size on the image is inversely proportional to distance from the workpiece 5 to the camera 7. Therefore, if distance from the reference position to the camera 7 (camera height) is Z0, and distances from the camera 7 to the workpieces 5 at height Z1 and Z2 are A1 and A2, respectively, the following equation (I) is satisfied.

$$SZ2/SZ1=A1/A2=(Z0-Z1)/(Z0-Z2) \quad (I)$$

The camera height Z0 can be computed from the following equation (II). The image size SZ3 when the height of the loading state changing position is Z3, can be calculated from the following equation (III).

$$Z0=(SZ2*Z2-SZ1*Z1)/(SZ2-SZ1) \quad (II)$$

$$SZ3=((Z0-Z1)/(Z0-Z3))*SZ1 \quad (III)$$

If, for example, workpiece detection area is circular, diameter D1 of workpiece detection area corresponding to the image size SZ1 is set in advance. At step S14d, using this D1, diameter D3 of workpiece detection area corresponding to the image size SZ3 is calculated from the following equation (IV).

$$D3=(SZ3/SZ1)*D1=((Z0-Z1)/(Z0-Z3))*D1 \quad (IV)$$

Figure 5A:
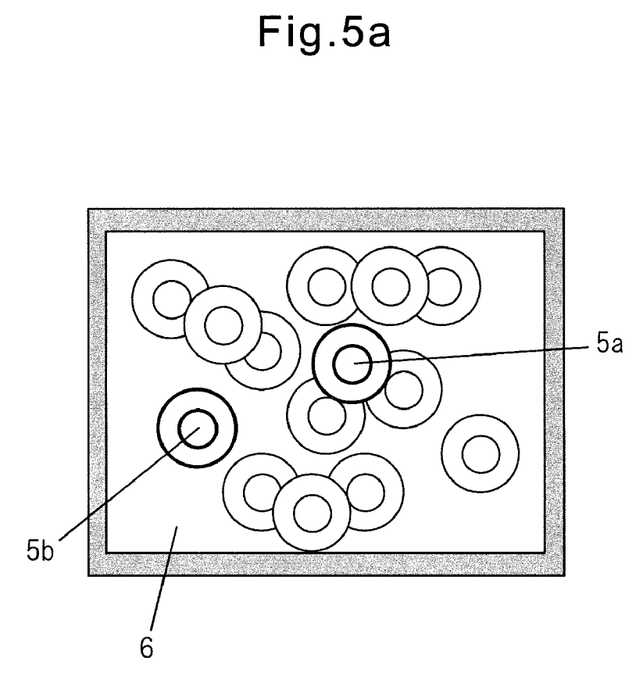
FIG. 5a is a view useful for explaining the operation of the workpiece removing device according to an embodiment of the present invention.

Operation of the workpiece removing device 1 according to the embodiment of the present invention will be described in more detail below. It is assumed, for example, that a plurality of workpieces 5 are disposed in bulk in a container 6 as shown in FIG. 5a. In this case, firstly, workpiece detection area is set so as to surround the entire container, and after the workpieces 5 are detected in the entire area in the container (step S2), a workpiece 5a located at higher position than surrounding workpieces 5 and not covered by other workpieces 5 is selected as the workpiece 5 to be removed by the robot 2 (step S6).

Figure 5B:
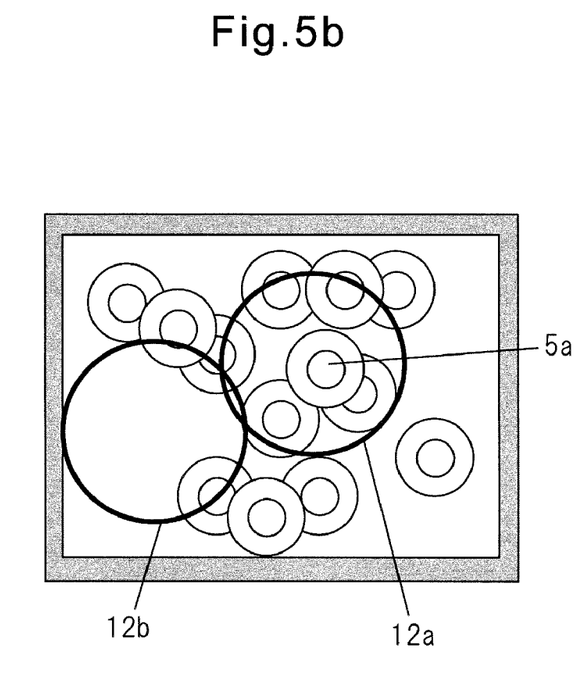
FIG. 5b is a view useful for explaining the operation of the workpiece removing device according to an embodiment of the present invention.

In removing the selected workpiece 5a, if, for example, the robot hand comes into contact with the workpiece 5a before the robot hand grasps the workpiece 5a, the position of the workpiece 5a is shifted as shown in FIG. 5b. In this case, a shock is detected by the shock sensor 4, and the position of the selected workpiece 5a is stored as the loading state changing position (step S11), and furthermore, a workpiece 5 is selected again (step S6). At this time, as shown in FIG. 5a, if a workpiece 5b different from the previous one is selected, this workpiece 5b is removed by the robot 2, and the position of the workpiece 5b is stored as the loading state changing position (step S13).

In this case, as shown in FIG. 5b, workpiece detection area 12a is set in the area including the workpiece 5a's position stored at the time of the shock detection, and workpiece detection area 12b is set in the area including the workpiece 5b's position stored at the time of the workpiece removing by the robot 2 (step S14d). Then, after the entire area in the container is imaged with the camera 7, the camera image is used to detect workpieces 5 in each workpiece detection area 12a and 12b (step S2). Therefore, since workpiece detection area for workpieces 5 is restricted, time required for the workpiece detection is shortened As a result, efficient workpiece removing operation becomes possible.

At the time of the workpiece removing, if no shock is detected by the shock sensor 4 and the workpiece grasping operation by the robot 2 is not detected, there is no loading state changing position, and therefore, the workpiece detection area surrounding the entire container is set (step S14e). Also, if no workpiece 5 is detected in the workpiece detection area set at step S14d (for example, if only retrieval window 12b in FIG. 5b is set), the work piece detection area surrounding the entire container is set (step S5). In these cases, a workpiece 5 is detected from the entire container again.

In accordance with the present embodiment, the following effects can be obtained.

(1) By processing in the workpiece loading state determination section 8c (step S10 and step S12), it is determined whether or not the loading state of workpieces 5 has changed, and if it is determined that the loading state of workpieces 5 has changed, by processing in the workpiece detection area setting section 8e (step S14d), the workpiece detection area is set in the peripheral area of the changing position of the loading state, and by processing in the workpiece detection section 8a (step S2), a workpiece 5 is detected in the workpiece detection area. Therefore, a workpiece 5 is detected in a portion of the workpiece loading area, so that workpiece detection area becomes narrower. Time required for workpiece detection is thereby shortened, and workpiece removing operation can be carried out efficiently.

(2) When the grasping operation of a workpiece 5 by the robot 2 is determined to be successful, loading state of workpieces 5 is determined to have changed, so that the change of the loading state after removing of a workpiece 5 can be determined correctly. In this case, workpiece detection area is set in a peripheral area of the position of the workpiece 5 selected by the workpiece selection section 8b, so that the workpiece detection processing can be effectively carried out at the location where change of the loading state is highly probable. Alternatively, in the case that the workpiece detection area is set in a peripheral area of the position where the workpiece 5 was grasped by the robot 2, the workpiece detection processing can be effectively carried out even if actual position of the workpiece 5 differs from the position of the selected workpiece 5.

(3) When it is determined that the robot 2 has been shocked before the robot 2 grasps a workpiece 5, the loading state of workpieces 5 is determined to have changed, and therefore, the change of the loading state due to the shock can be correctly determined. In this case, since the workpiece detection area is set in a peripheral area of the position of the workpiece 5 selected by the workpiece selection section 8b, the workpiece detection processing can be effectively carried out at the location where change of the loading state is highly probable. Alternatively, in the case that the workpiece detection area is set in a peripheral area of the position where a shock was exerted on the robot 2, the workpiece detection processing can be effectively carried out even if actual position where the robot 2 was shocked differs from the position of the selected workpiece 5.

(4) When there are a plurality of the loading state changing positions, for example, when, after a shock exerted on the robot 2 was detected, a workpiece 5 located at different position from the shock detection position was removed (for example, as shown in FIG. 5), workpiece detection areas 12a and 12b corresponding to respective loading state changing positions are set. Therefore, a workpiece 5 in the area where the loading state has changed can be accurately detected, together with time required for the workpiece detection can be shortened.

(5) If the size of the workpiece detection area is automatically changed in accordance with a distance between the selected workpiece 5 and the camera 7, a relative size of the workpiece detection area to workpieces 5 on the image becomes constant, regardless of the actual height of workpieces 5 in the container, and therefore, a workpiece 5 can be efficiently detected.

Although, in the embodiment described above, the workpiece detection section 8a, the workpiece selection section 8b, the workpiece loading state determination section 8c (a loading state determination section), the workpiece loading state changing position storage section 8d, the workpiece detection area setting section 8e (an area setting section), the camera control section 8f, the memory 8g, and the visual sensor control section 8h are included in the robot controller 8, the construction of the robot controller 8 is not limited to this construction. For example, the workpiece detection section 8a, the workpiece detection area setting section 8e, the camera control section 8f, and the visual sensor control section 8h may be provided outside of the robot controller 8, and communication means may be used to transmit the result of image processing to the robot controller 8. The workpiece loading state changing position storage section 8d may be omitted, and the loading state changing position may be stored in the memory 8g.

Although, in the embodiment described above, a circular or rectangular workpiece detection area is set in a portion of the workpiece loading area when it is determined that loading state of workpieces 5 has changed, the shape of the workpiece detection area is arbitrary. Although, by processing in the robot controller 8, success or failure of grasping operation for a workpiece 5 is determined (step S12) and presence or absence of a shock exerted on the robot 2 is determined (step S10), the construction of the workpiece loading state determination section as a grasping determination section and the construction of the workpiece loading state determination section as a shock determination section is not limited to the above described construction. Thus, the present invention is not limited to the workpiece removing device 1 described in the embodiment, as long as features and functions of the present invention can be realized.

In summary, the workpiece removing method according to the present embodiment is characterized in that the method includes an imaging step for imaging a workpiece loading area including a plurality of workpieces 5 loaded in bulk with a camera 7 (step S1); a workpiece detection step for detecting workpieces 5 based on the camera image imaged with the camera 7 (step S2); a workpiece selection step for selecting a workpiece 5 to be removed based on a detection result in the workpiece detection step (step S6); a workpiece removing step for removing the workpiece 5 selected in the workpiece selection step with a robot 2 (step S9); a loading state determination step for determining whether or not a loading state of workpieces 5 has changed due to a operation of the robot (step S10, step S12); an area setting step for setting a workpiece detection area for detecting the workpieces 5 in the workpiece detection step (step S14d); wherein, in the area setting step, if it is determined in the loading state determination step that the loading state of workpieces 5 has changed, the workpiece detection area is set in a peripheral area of a changing position of the loading state, i.e., in a portion of the workpiece loading area. As long as this characteristics is realized, above construction may be modified in various manner.

In accordance with the present invention, the workpiece detection area is set in a peripheral area of a changing position where the loading state of workpieces has changed. Therefore, as compared to workpiece detection area set over the entire workpiece loading area, workpiece detection area is smaller and processing time required for workpiece detection can be significantly shortened. As a result, waiting time of the robot for imaging and detection of workpieces is reduced, and the workpiece removing operation can be carried out efficiently.

While the present invention has been described with reference to the preferred embodiment thereof, it will be understood, by those skilled in the art, that various changes and modifications may be made thereto without departing from the scope of the appended claims.

The invention claimed is:

1. A workpiece removing device comprising:
a camera for imaging a workpiece loading area including a plurality of workpieces loaded in bulk;
a workpiece detection section for detecting a workpiece, based on a camera image imaged with the camera;
a workpiece selection section for selecting a workpiece adapted to be removed, based on a detection result by the workpiece detection section;
a robot for removing the workpiece selected by the workpiece selection section;
a loading state determination section for determining whether a loading state of the workpieces in the workpiece loading area has changed due to an operation of the robot; and
an area setting section for setting a workpiece detection area where the workpiece detection section detects a workpiece;
wherein, the area setting section sets the workpiece detection area corresponding to the workpiece loading area in an initial state, if the loading state determination section determines that the loading state of the workpieces has changed, the area setting section sets the workpiece detection area in a portion of the workpiece loading area, the portion being a peripheral area of a changing position of the loading state;
wherein, if the workpiece is not detected in the workpiece detection area set in the portion of the workpiece loading area, the area setting section determines whether a specified termination condition is satisfied; and
wherein the specified termination condition is not satisfied, the area setting section sets the workpiece detection are corresponding to the workpiece loading area.

2. The device of claim 1, further comprising a grasping determination section for determining success or failure of a grasping operation in which the robot grasps the workpiece selected by the workpiece selection section,
wherein, if the grasping determination section determines that the grasping operation by the robot was successful, the loading state determination section determines that the loading state of the workpieces has changed.

3. The device of claim 1, further comprising a shock determination section for determining presence or absence of a shock exerted on the robot before the robot grasps the workpiece selected by the workpiece selection section,
wherein, if the shock determination section determines that there was the shock, the loading state determination section determines that loading state of the workpieces has changed.

4. The device of claim 2, wherein the changing position of the loading state is a position of the workpiece selected by the workpiece selection section or a position where the workpiece was grasped by the robot.

5. The device of claim 3, wherein the changing position of the loading state is a position of the workpiece selected by the workpiece selection section or a position where the shock was exerted on the robot.

6. The device of claim 1, wherein, if there are a plurality of the changing positions of the loading state, the area setting section sets the workpiece detection areas in correspondence to respective the changing positions of the loading state.

7. The device of claim 1, wherein the area setting section changes a size of the workpiece detection area, in accordance with a distance between the workpiece selected by the workpiece selection section and the camera.

8. A workpiece removing method comprising:
an imaging step for imaging a workpiece loading area including a plurality of workpieces loaded in bulk with a camera;
a workpiece detection step for detecting a workpiece, based on a camera image imaged with the camera;
a workpiece selection step for selecting a workpiece adapted to be removed, based on a detection result in the workpiece detection step;
a workpiece removing step for removing the workpiece selected in the workpiece selection step with a robot;
a loading state determination step for determining whether a loading state of the workpieces in the workpiece loading area has changed due to a operation of the robot; and
an area setting step for setting a workpiece detection area for detecting the workpiece in the workpiece detection step;
wherein in the area setting step, the workpiece detection area corresponding to the workpiece loading area is set in an initial state, if it is determined in the loading state determination step that the loading state of the workpieces has changed, the workpiece detection area is set in a portion of the workpiece loading area, the portion being a peripheral area of a changing position of the loading state;
wherein, if the workpiece is not detected in the workpiece detection area set in the portion of the workpiece loading area, it is determined whether a specified termination condition is satisfied; and
wherein the specified termination condition is not satisfied, the workpiece detection area corresponding to the workpiece loading area is set.

* * * * *